Feb. 20, 1934. A. W. PHELPS 1,948,006
ARMATURE CORE INSULATING MACHINE
Filed Nov. 26, 1930   8 Sheets-Sheet 7
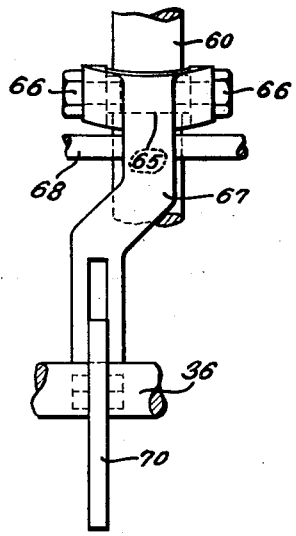
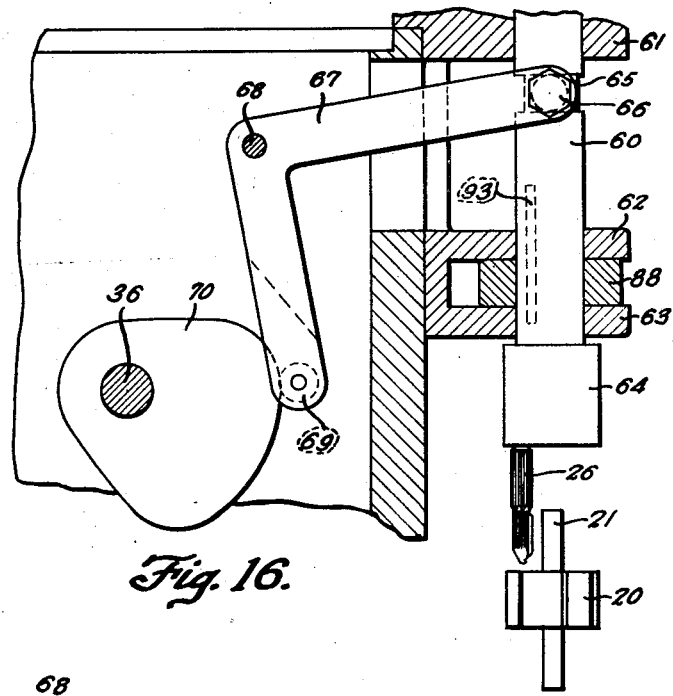

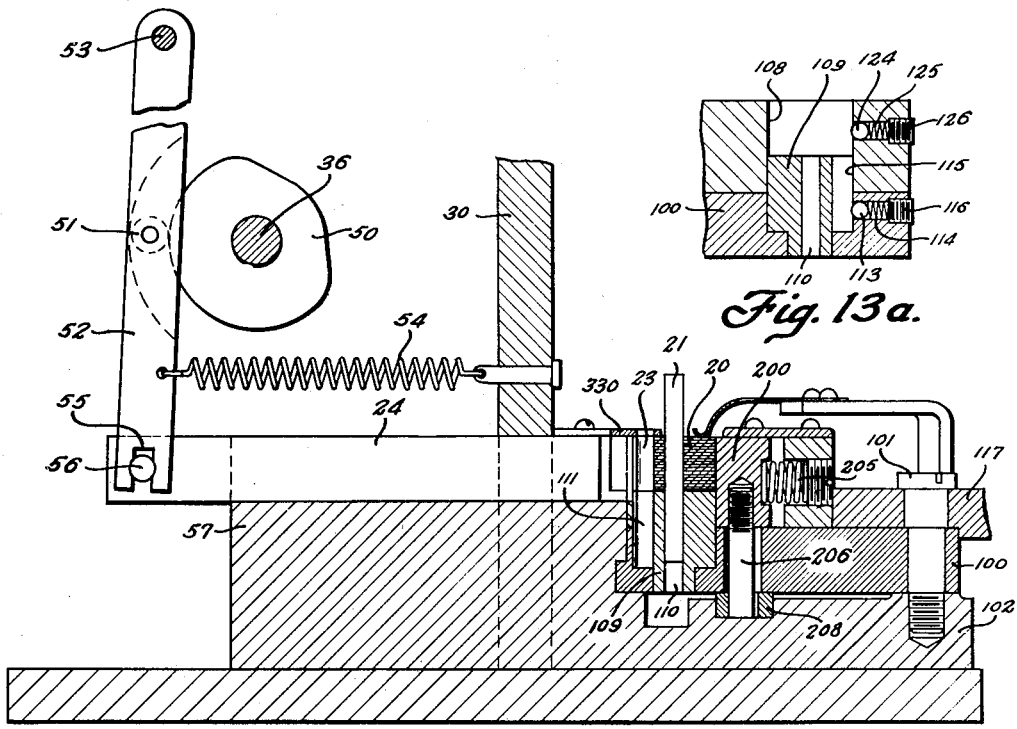
Fig. 13a.
Fig. 12.
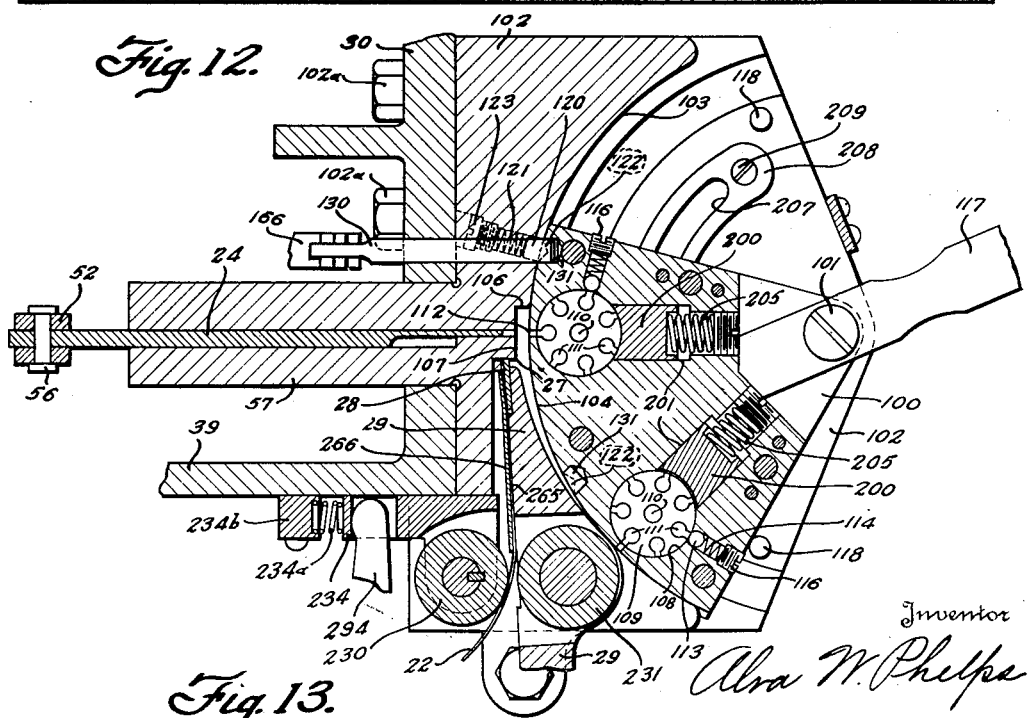
Fig. 13.

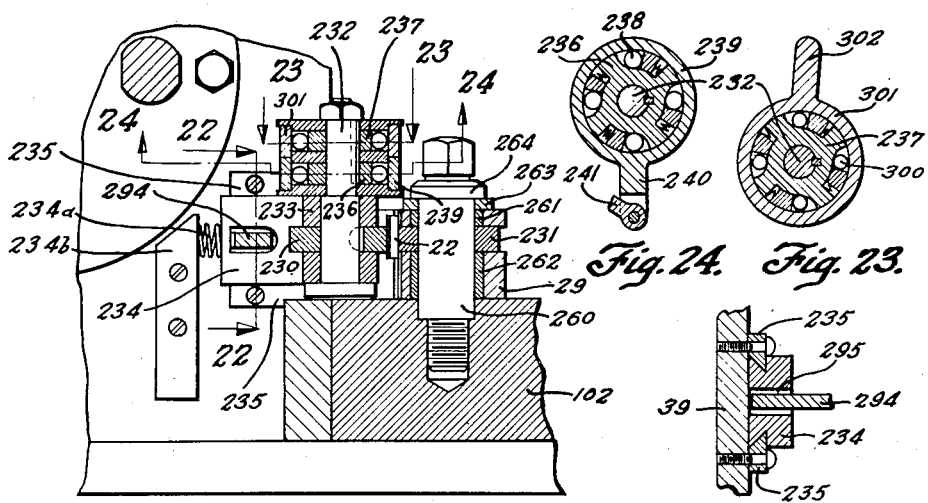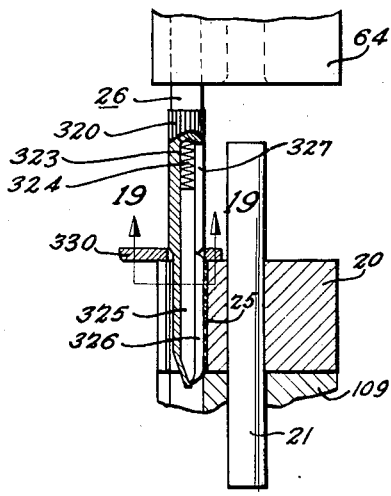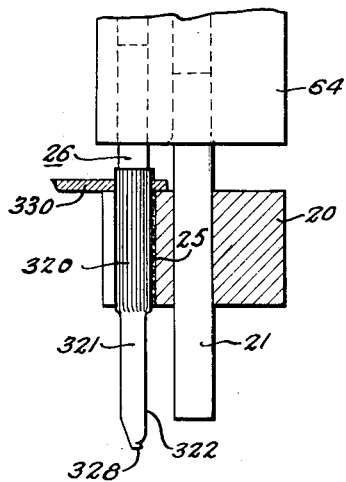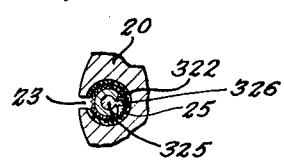

Patented Feb. 20, 1934

1,948,006

UNITED STATES PATENT OFFICE 1,948,006

ARMATURE CORE INSULATING MACHINE

Alva W. Phelps, Anderson, Ind., assignor to Delco-Remy Corporation, Anderson, Ind., a corporation of Delaware Application November 26, 1930
Serial No. 498,350

19 Claims. (Cl. 29—84)

This invention relates to apparatus for lining the slots of armature cores for dynamo electric machines prior to winding wire into the slots and has for its object the provision of a machine which will automatically feed sheet insulation material adjacent the core slots and cause this material to be moved into the slots and to be so shaped that it will conform to the sides of the armature core teeth defining the slots.

In the disclosed form of the present invention, means are provided for automatically feeding a strip of insulating material adjacent a core slot, for causing a sufficient quantity of this material to be cut off from the end of the strip in order to provide sufficient insulation for a core slot. Means are provided for automatically moving this strip of material into the core slot and for causing the material to be shaped so that it will conform to the walls thereof, means are provided for automatically turning or indexing the armature core in order to move its slots successively into position for receiving the insulation material.

Further objects and advantages of the present invention will be apparent from the following description, reference being had to the accompanying drawings wherein a preferred embodiment of one form of the present invention is clearly shown.

In the drawings:

Fig. 1 is a perspective view of a machine embodying the present invention.

Figs. 2 to 6 inclusive are diagrammatic views illustrating the mode of operation of the machine.

Figure 8:
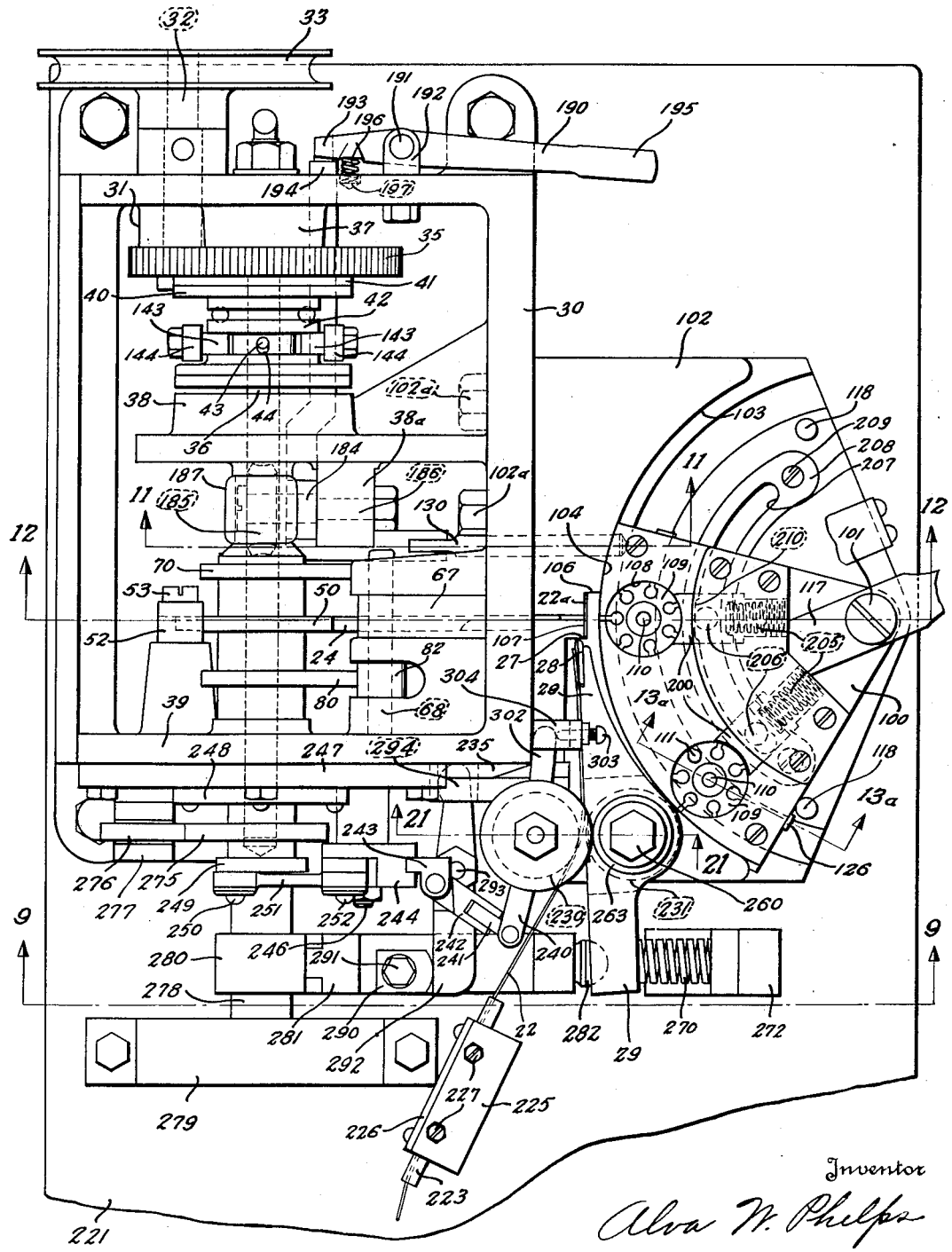
Fig. 8 is a plan view of the machine.
Figure 11:
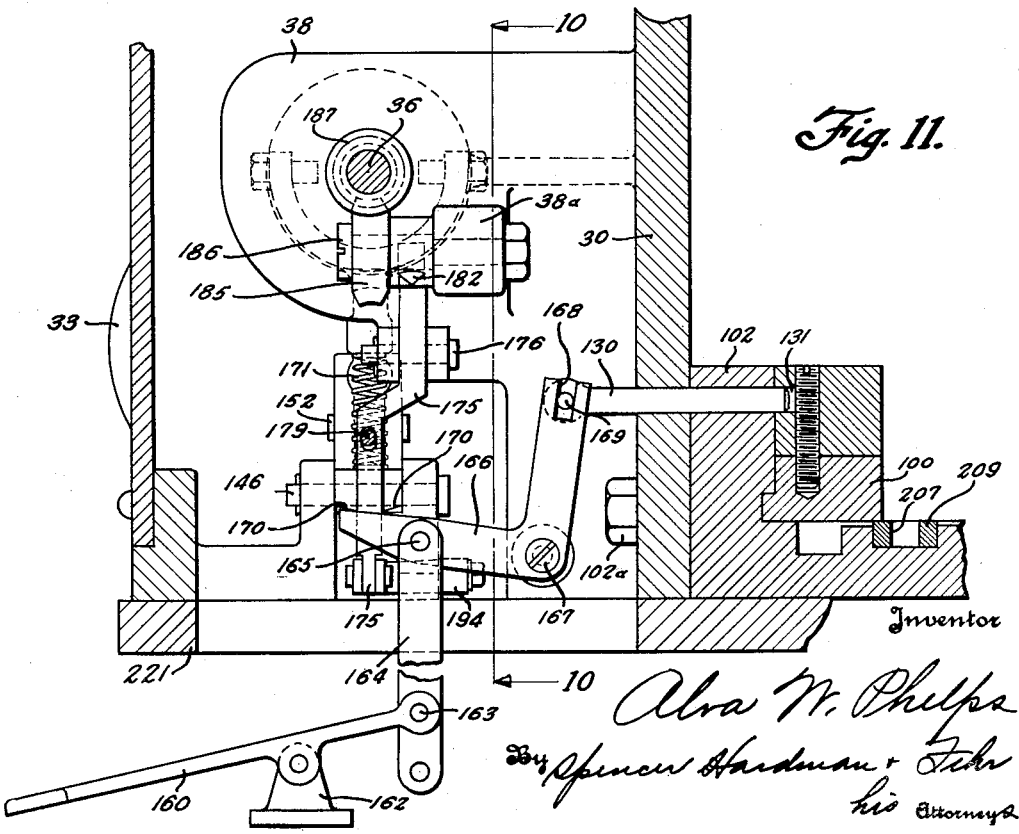

Figs. 11 and 12 are sectional views taken respectively on the lines 11—11 and 12—12 of Fig. 8.

Figure 9:
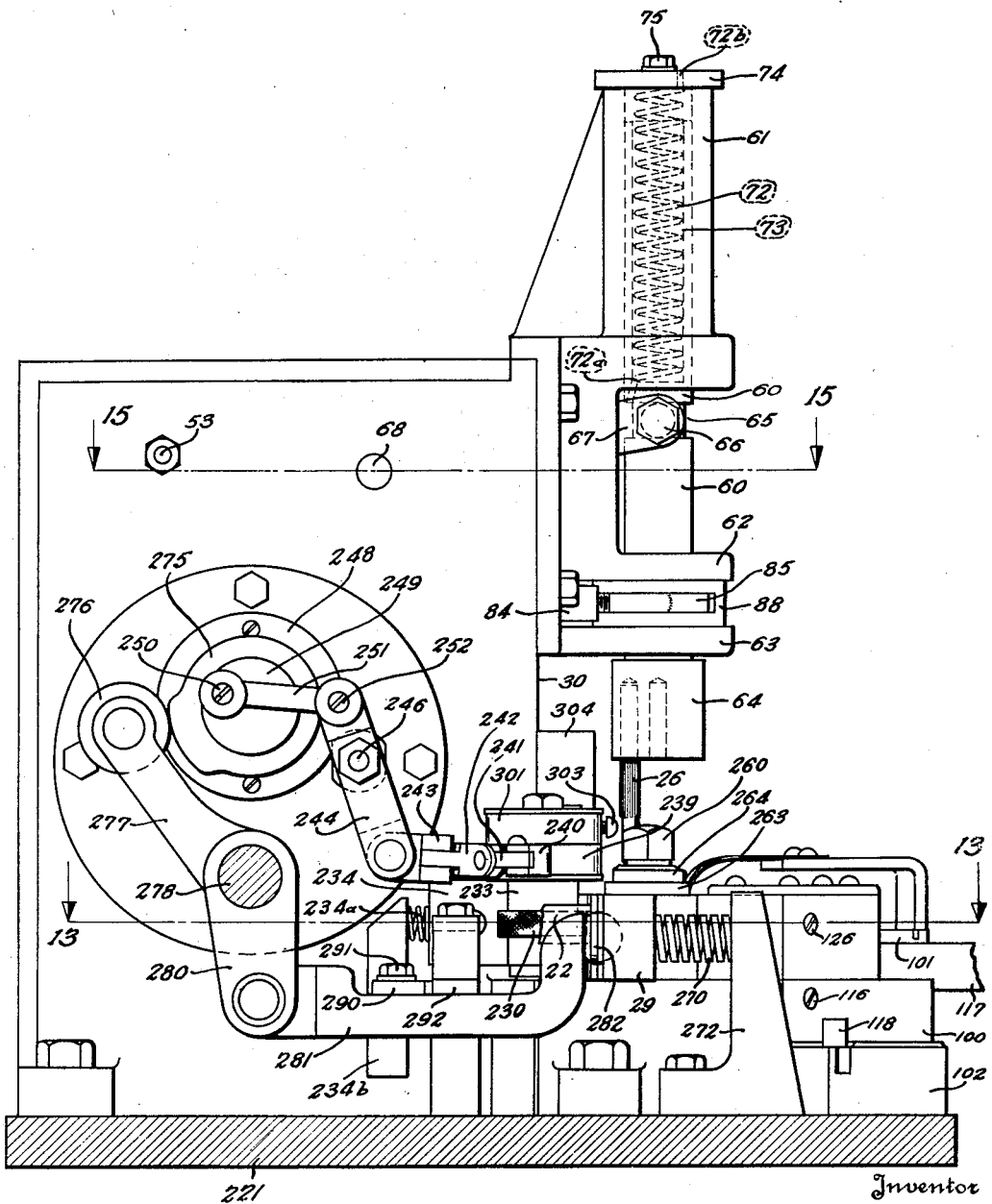
Fig. 9 is an end view taken on the line 9—9 of Fig. 8.

Fig. 13 is a sectional view taken on the line 13—13 of Fig. 9.

Fig. 13a is a sectional view taken on the line 13a—13a of Fig. 8.

Fig. 14 is a side view of a plunger turning mechanism included in the machine.

Fig. 15 is a plan view thereof taken on the line 15—15 of Fig. 9.

Fig. 16 is a side view of the plunger reciprocating mechanism.

Fig. 17 is an edge view of the plunger reciprocating mechanism.

Fig. 18 is an enlarged view, partly in vertical longitudinal section, showing the plunger in cooperative relation with the slot lining insulation.

Fig. 19 is a sectional view on the line 19—19 of Fig. 18.

Fig. 20 is a view similar to Fig. 18 showing the plunger in lowermost position relative to the armature core.

Fig. 21 is a sectional view on line 21—21 of Fig. 8.

Figs. 22, 23 and 24 are sectional views taken respectively on lines 22—22 and 23—23 and 24—24 of Fig. 21.

Figure 2:
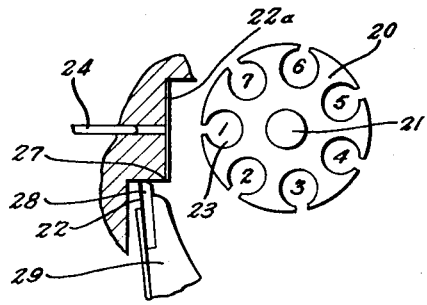
Figure 3:
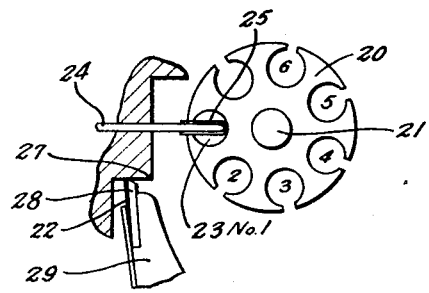
Figure 6:
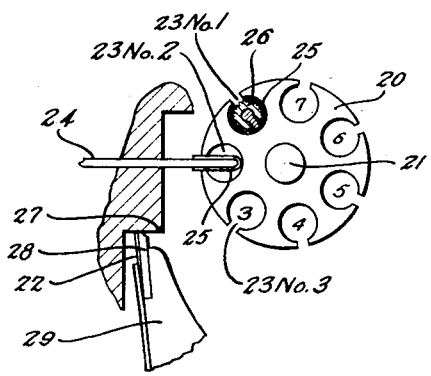

The mode of operation of the machine will first be described with reference to Figs. 2 to 6. In these figures, 20 designates a slotted armature core which is attached to an armature shaft 21. A strip of insulating paper 22 is fed through a holder 29 and a portion 22a thereof located adjacent a core slot 23 is cut off by cooperating relatively stationary and movable shear blades 27 and 28 as shown in Fig. 2. Fig. 3 shows that a reciprocating slide has moved the strip of paper 22a from the position shown in Fig. 2 to that shown in Fig. 3. The strip of paper is now in the form of a U-shaped strip or loop 25 in Fig. 3. The reciprocating slide 24 is retracted from the slot 23 leaving a loop 25 of insulation paper within the slot. Then a cylindrical pointed plunger 26 is caused to descend and enter the slot 23 and cause the paper loop 25 to be rounded out as indicated in 25a of Fig. 4 in order that this loop will conform to the shape of the slot. Then, while the plunger 26 is within the slot 23 and is thus holding the insulating paper in position, the plunger 26 is moved bodily in a clockwise direction about the axis of the shaft 21 into the position shown in Fig. 5, thus rotating the core 20 so that the next succeeding core slot 23 No. 2 will be moved adjacent to the forming slide 24. While the plunger 26 remains in the slot 23 No. 1 the slide 24 is advanced as before until it forms a second paper loop 25 in the slot 23 No. 2 as shown in Fig. 6. After the slide 24 is withdrawn, the plunger 26 is withdrawn from the slot 23 No. 1, and is turned back into alignment with the slot 23 No. 2. Then the plunger 26 descends in order to spread out the paper loop 25 so that it will conform to the shape of slot 23 No. 2 while the paper is still clamped to the core tooth periphery. This operation is continued until all of the slots have been lined with insulating paper as shown in Fig. 7.

Figure 7:
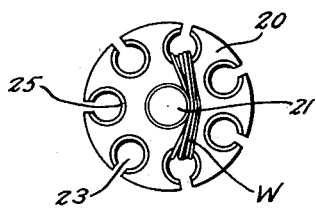
Fig. 7 is an end view of an armature, the slots of which have been insulated by the present machine. One armature coil has been wound upon the core.

After covering the armature core slots with strips of insulating material, armature windings, the first of which is shown at W in Fig. 7, are applied. The windings W hold the insulation pieces 25 in place.

The machine for performing the operations illustrated in Figs. 2 to 5 comprises chiefly a mechanism for reciprocating the slide 24; a mechanism for vertically reciprocating the plunger 26; a mechanism for turning the plunger 26 about an axis in alignment with the axis of the armature shaft 21; a work carrier by which an armature core is transferred from a loading position to an operating position adjacent the folding slide 24; a mechanism for locking the work carrier in operating position as long as the other mechanisms are in operation; a control apparatus for causing the mechanism to automatically stop after all of the slots have been lined with insulating material; and means for supplying insulation pieces for lining the core slots.

The machine comprises a main frame 30 which provides a bearing 31 for a shaft 32 carrying a belt driven pulley 33. The shaft 32 operates a gear 34 which meshes with a gear 35 loosely journalled upon a shaft 36 which is supported by bearings 37, 38 and 39. The gear 35 carries a friction clutch disc 40 adapted to cooperate with a clutch disc 41 which is moved sidewise by a grooved collar 42 slidably connected with the shaft 36 by pin and slot connections 43 and 44 (see Fig. 8). When the clutch members 40 and 41 are connected the drive pulley 33 will rotate the shaft 36.

Referring to Figs. 9, 12 and 13, the paper folding slide 24 is operated by a mechanism including a cam 50 which is operated by shaft 36 and which cooperates with a roller 51 attached to lever 52 which is pivoted by screw 53 attached to the machine frame 30. A spring 54, connecting the lever 52 with the machine frame, maintains the roller 51 in engagement with the cam 50. The lower end of lever 52 is provided with a notch which receives a pin 56 attached to the slide 24. The slide 24 is guided by a grooved guide 57 provided by a work holder bracket 102 to be described.

Referring to Figs. 9, 16 and 17, the mechanism for vertically moving the pointed plunger 26 includes a sliding shaft 60 which is guided by bearings 61, 62 and 63, provided by the machine frame 30. The shaft 60 is in axial alignment with the armature shaft 21 when the armature core 20 is in position for receiving the operations of the machine, and the pointed plunger 26 is carried by the head in such a position that it is adapted to be received by the armature core slots. The sliding shaft 60 is provided with a groove 65 which is adapted to receive rollers 66 carried by a bifurcated bell crank lever 67 which is pivoted upon a rod 68 supported by the machine frame. The lever 67 carries a roller 69 which cooperates with a cam 70 driven by the shaft 36. The roller 69 is urged against the cam 70 by a compression spring 72 which is received by a central recess 73 in the upper end of the rod 60 which slides within the bearing 61. The spring 72 is located between the bottom of the recess 73 and a plate 74 which is attached by screws 75 to bearing 61.

Figure 1:
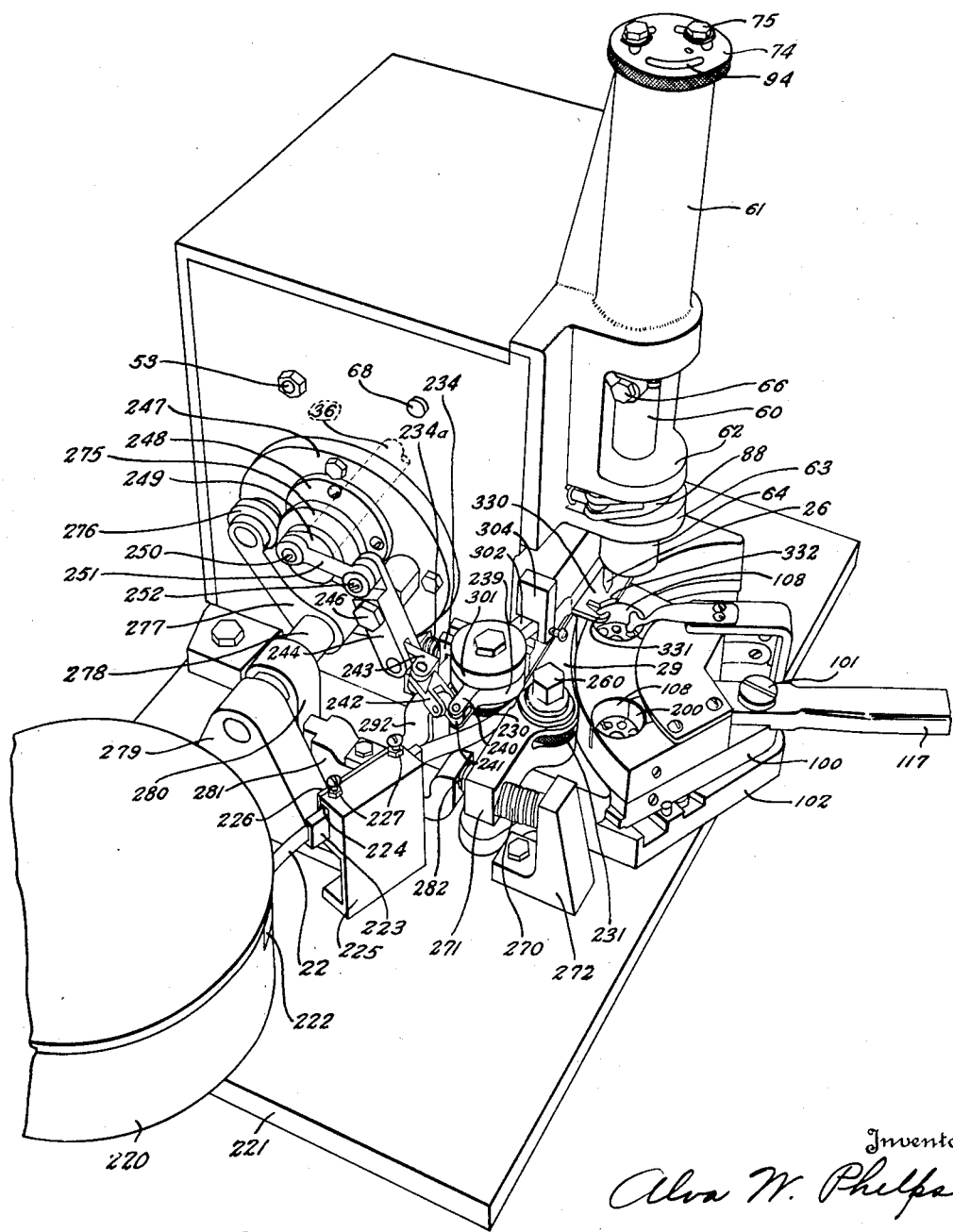

The mechanism for twisting the shaft 60 is shown in Figs. 14 and 15, and includes a cam 80 which is operated by the shaft 36 and cooperates with a roller 81 connected with a lever 82 which is pivotally supported by the rod 68. The lever 82 has a slot 82a which receives a pin 83 attached to a sliding rod 84 having an adjustable extension 85. The extension 85 is provided with a slot 86 which receives a screw 87 attached to a lever 88 which is located between the bearings 62 and 63. The lever 88 includes clamping portions 89 and 90 which cooperate with a clamp screw 91 which passes through a plain hole into part 90 and is threaded into part 89. These parts are held in position by a key 92 which is received by a keyway 93 in the shaft 60. The roller 81 is maintained in engagement with cam 80 by the spring 72. Besides being a compression spring, spring 72 is a torsion spring having one end 72a attached to the shaft 60 adjacent the bottom to the recess 73, and having its other end 72b attached to the plate 74. The plate 74 is provided with arcuate slots 94 as shown in Fig. 1, which receive the screws 75. When the screws 75 are loosened the plate 74 may be turned to vary the torsional effect produced by the spring 72 upon the shaft 60. By tightening down the screws 75 the plate 74 will be secured in the desired position of adjustment. As viewed in Fig. 14, the cam 80 tends to move the lever 88 in a counterclockwise direction, but the spring 72 is so twisted that it tends to rotate the lever 88 clockwise, thus maintaining the roller 81 in engagement with the cam 80.

A work holder 100 which is circularly segmental in form is pivotally mounted upon screw 101 on a work holder bracket 102 which is secured by screws 102a to the machine frame 30. The bracket 102 is provided with a cylindrical surface 103 concentric with the screw 101, and this surface 103 receives a cylindrical surface 104 of work holder 100. The work holder bracket 102 is provided with a shoulder 106 joining the surface 103 with surface 107 approximately parallel to the tangent to the surface 103. This shoulder 106 provides a stop for the insulating paper strip 22 which is guided toward the stop 106 by the paper guide 29. The work holder 100 is provided with cylindrical recesses 108 each of which receives a solid rotatable block 109, which has the same contour as the armature core which is received by the recess. The block 109 is provided with a central hole 110 adapted to receive the armature shaft 21 and with slots 111 which are adapted to be located in alignment with the slots of the armature core. The side wall of each of the recesses of 108 is provided with an opening 112 leading to the peripheral surface 104. These openings are provided for the purpose of receiving the paper folding slide 24. Each block 109 is rotatable within the recess 108 and is maintained in a certain position by spring pressed ball 113 which is urged by a spring 114 into engagement with the edges of the teeth parts 115 which define the slots 111. A plug 116 maintains the spring 114 in position. The work holder is operated by a handle 117 in order to bring either of the slots 112 opposite the end of the paper folding slide 24. Motion of the work holder 100 is limited in either direction by pin 118 attached to the bracket 102. The work holder 100 is yieldingly maintained in either of these positions and accurately located by a plunger 120 which is yieldingly pressed by spring 121 into either of two depressions 122 in the holder. The spring 121 is retained in position by plug 123.

Referring to Fig. 13a the work holder 100 carries adjacent each recess 108 a spring pressed ball or plunger 124 which is adapted to be received by one of the notches of an armature core 20 which is placed within the recess in order to yieldingly maintain the core slots in alignment with slots 111 of the rotatable plug 109. The ball 124 is urged inwardly by a spring 125 which is retained by a plug 126.

The diameter of a recess 108 is greater than the diameter of the core 20 to provide an easy running fit between the core and work holder. In order that the core slot, which is operated upon by the plunger 26 will be in alignment therewith means are provided for urging the armature core being operated upon toward that side of the recess 108 which is nearest the opening 112. Adjacent each recess 108 there is located a slide 200 which is guided by a recess 201 in block 102. Each slide 200 is yieldingly urged within a recess 108 by a spring 205. Whenever a recess 108 is moved to an unloading position, its slide 200 is automatically retracted. Each block 200 threadedly carries a pin 206 which travels in a slot 207 provided by an arcuate bar 208 secured by screws 209 to the bracket 102. The slot 207 provides a notch 210 in alignment with the slide 24 as shown in Fig. 8. When either of the pins 206 is located in alignment with the slide 24 the spring 205 is released to cause the block 200 to push the core 20 against that side of the core recess 108 which is nearest the end of the slide 24. Whenever either of the pins 206 is moved out of alignment with the slide 24 the pin is caused to be moved into a narrower part of the slot 207 thereby causing the pin to move away from the end of the slide 24 in order to retract the block 200 from engagement with the armature core 20. It is therefore apparent that when one of the armature cores is located in a position to be operated upon by the slide and plunger it will be forced by the spring pressed block 200 into such position that the core slot then to be insulated will be in vertical alignment with the plunger 26 while at the same time the core in the other work holder may be easily withdrawn from the work holder recess since the block 200 associated with it is in retracted position.

The work holder 100 is maintained in either of its positions with either of the recesses 108 opposite the slide 24 while the machine is in operation by mechanism which includes a slide 130 guided by the frame 30 and bracket 102 and adapted to be received by either of two cylindrical recesses 131 provided by the work holder 100. The slide 130 is controlled by the mechanism which also controls the starting and stopping of the machine.

Figure 10:
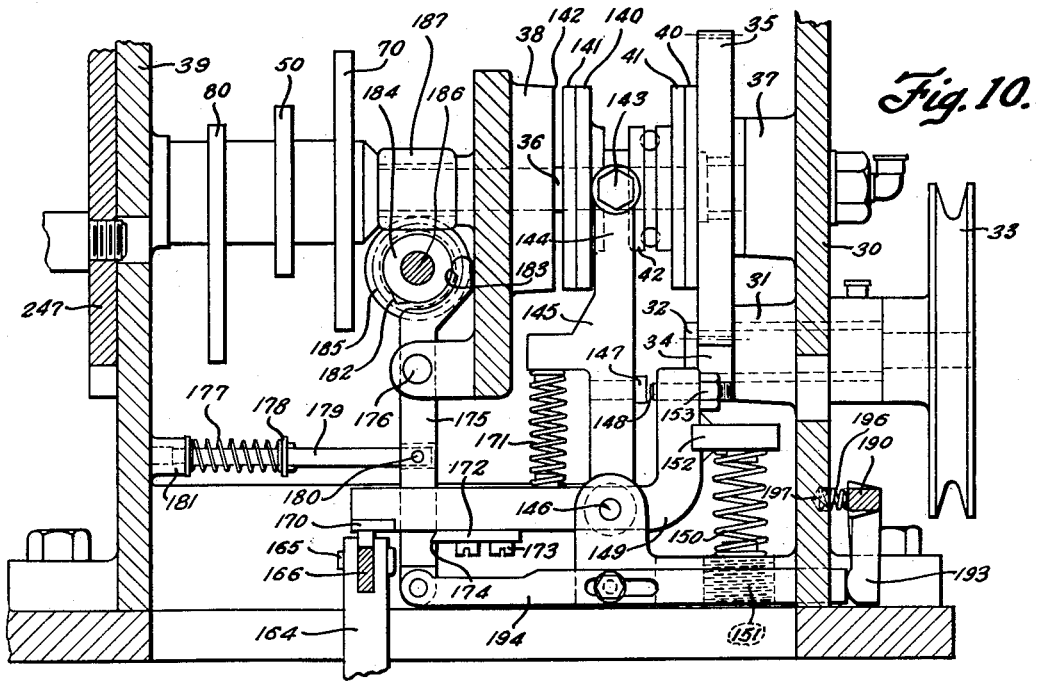
Fig. 10 is a sectional view taken on the line 10—10 of Fig. 11.

When the machine shaft 36 is at rest the clutch shifting member 42 will be moved to the left of the position shown in Fig. 10 so that clutch member 41 will be disengaged from the clutch member 40. The member 42 is provided with a flange 140 to which is secured a brake disk 141, which in the rest position of the machine, is caused to bear yieldingly against a stationary brake surface 142 provided by bearing 38. The grooved collar 42 receives pins 143 carried by the members 144 of a bifurcated shifting lever 145 which is pivoted at 146 upon the machine frame. The lever 145 carries a stud 147 which is adapted to be engaged by a screw 148 which is adjustably carried by a lever 149 which is also supported by the pin 146. Normally the lever is urged in a counterclockwise direction by spring 150 bearing against a plug 151 attached to the machine frame and against a lug 152 forming a part of lever 149. The screw 148 is secured in adjusted position by a nut 153. Normally the spring 150 causes the lever 149 to move so that the screw 148 will engage the stud 147 to cause the lever 145 to move counterclockwise so that the brake disk 141 will be yieldingly urged into contact with the brake member 142. In this way the machine is brought quickly to rest after the clutch members 40 and 41 are disengaged.

To engage the clutch members 40 and 41 the operator depresses a pedal 160 which is pivoted at 161 upon a bracket 162 and which is attached at 163 to a link 164. Link 164 is attached by pin 165 to a bell crank lever 166 which is fulcrumed upon a screw 167 attached to the machine frame. Lever 166 is provided with a notched end 168 which receives a pin 169 connected with the locking slide 130. Obviously, when the pedal 160 is moved in a counterclockwise direction, as viewed in Fig. 11, the bell crank lever 166 will be moved clockwise and the slide 130 will be shifted so as to be received by one of the recesses 131 in the work holder 100 so as to prevent movement of the work holder while the machine is in motion.

During the motion of pedal 160 described, the lever 166 engages the end 170 of the lever 149 and will cause it to move in a clockwise direction as viewed in Fig. 10. This movement of the lever 149 will cause the lever 145 to move toward the right and the clutch member 41 to be yieldingly pressed against the clutch member 40 due to a spring 171 which transmits motion in one direction between the levers 149 and 145. When the clutch members are engaged, as shown in Fig. 10, the lever 149 will be latched in this position by virtue of the engagement of a latch plate 172, attached by screws 173 to the lever 149, with a shoulder 174 provided by a latching lever 175 which is pivoted at 176 upon the machine frame. The latching lever is urged in a counterclockwise direction by a spring 177 bearing at its left end against the machine frame 30 and at its right end against a collar 178 carried by a rod 179. The rod 179 is attached at 180 to lever 175 and its left end slides through the boss on the machine frame at 181. The latching lever 175 is controlled by a rotatable camming stud 182 which is adapted to engage the end 183 of lever 175 and to move the lever in a clockwise direction in order to disengage it from the latch 172. This camming stud 182 is attached to the hub 184 of a gear 185 which is mounted upon a stub shaft 186 attached to a bracket 38a extending from the bearing bracket 38 (see Figs. 8 and 11). The gear 185 meshes with a gear 187 attached to the shaft 36. These gears have a ratio depending upon the number of slots in the armature core. When the machine has performed the required number of cycles to line all of the core slots with insulation, the machine will be stopped automatically due to the engagement of the cam 182 with the lever end 183. As soon as the latch lever 175 is released from the plate 172, the lever 149 will be urged in a counterclockwise direction by the spring 150, and the brake members 141 and 142 will be engaged so that the machine will stop promptly.

In order to stop the machine at any time before its predetermined number of cycles have been completed there is provided a hand lever 190 which is pivoted upon a pin 191 carried by a bracket 192 attached to the machine frame. The left end of the lever 190 as viewed in Fig. 8 is provided with a downwardly projecting end 193 which receives an end of a bar 194 connected with lever 175 as shown in Fig. 10. By moving the handle 195 carried by the lever 190 counterclockwise the bar 194 will be moved toward the left, as viewed in Fig. 10, in order to withdraw the lever 175 from the latch plate 172. The handle 195 is urged toward the machine by a spring 196 located between the lever 190 and the machine frame and received by a recess 197.

The mechanism for supplying short strips of insulating paper to a point adjacent the slot of the core to be insulated will now be described. These short pieces of insulating paper are cut from the end of a strip of paper 22 which is fed from a supply roll (not shown) but which is contained in a cylindrical box 220 supported by the table 221 which supports the insulating machine. The strip of paper 22 passes out an opening 222 in the box 220 and then through a channel guide block 223 received by a horizontal groove 224 in a bracket 225 attached to the table 221, the groove 224 being vertically wider than the width of the block 223. The block 223 is confined within the groove by a plate 226 secured to the bracket 225. The block 223 is secured in a vertically adjusted position by two pairs of screws, one pair being shown at 227 in Fig. 1, and the other pair being directly opposite and vertically below the screws 227. By adjusting these pairs of screws the vertical height of the block 223 may be varied to bring the strip 22 into proper position with respect to other parts of the machine.

The strip 22 next passes between a driving feed roll 230 and an idler feed roll 231 having knurled peripheries. In Figs. 1, 8 and 21 the roller 230 is shown spaced from the roller 231. Roller 230 is keyed to a shaft 232, which is journalled in arms 233 of a bracket 234 which is guided for horizontal sliding movement between rails 235. The shaft 232 is keyed to clutch cams 236 and 237 of one-way roller clutches. Cam 236 is the driven clutch member of a one-way clutch which includes also balls 238 and a clutch shell 239 carrying a forked arm 240 shown in Fig. 1. The arm 240 is connected by articulated link members 241, 242 and 243 with a lever 244, these link members providing a universal joint connection between arm 240 and lever 244. Lever 244 is pivoted upon a screw 246 threaded into a bracket 247 which in turn provides a bearing 248 for the shaft 36 which carries a crank disc 249. Crank disc 249 carries a crank pin screw 250 connected by link 251 with a screw 252 providing a pivotal connection with the lever 244. It is therefore apparent that during one revolution of the crank disc 249 there will be an oscillation of the driving clutch shell member 239. This one-way clutch comprising the parts 239, 238 and 236 is so constructed as shown in Fig. 24 that when the arm 240 oscillates counterclockwise as viewed in Fig. 1, the shaft 232 will be rotated in this same direction for the purpose of feeding the paper strip 22 through the paper guide 29 toward the work holder recess 108 which is then in alignment with the plunger 26.

The idler roller 231 is rotatable about a screw stud 260 which is threaded into the bracket 102 and provides a journal for bearing bushings 261 and 262 which are press fitted into the paper guide 29. At the portion of the guide 29 which receives the bearing bushings 261 and 262, the guide 29 is slotted to receive the roller 231, thus the guide 29 can provide means for maintaining the roller 231 in horizontal alignment with the roller 230. A washer 263 is located between the guide 29 and the head 264 of the screw stud 260.

Referring to Fig. 13, the guide 29 provides a channel groove 265 for receiving the strip 22 which is retained in the groove 265 by cover plate 266 attached to the guide 29. The end of the guide nearest the end of the slide 24 carries the movable shear blade 28 which cooperates with the cutting edge 27 of the bracket 102 in order to sever from the supply strip that portion thereof which would be located adjacent the surface 107 of the bracket 102 and included between the stop 106 and the stationary shearing edge 27.

The paper guide and shear supporting block 29 is normally urged clockwise as viewed in Fig. 1 by a spring 270 located between the end 271 of the bracket 29 and a bracket 272 secured to the table 221. The block 29 is moved counterclockwise as viewed in Fig. 1 from a shear blade open position to a shear blade closed position shown in Fig. 13 by a mechanism which comprises a cam 275 driven by the shaft 36 and cooperating with a roller 276 carried by an arm 277 carried by a shaft 278 journalled in bearings provided by the bracket 247 and the bracket 279 attached to the table 221. The shaft 278 carries an arm 280 pivotally connected with a link 281 having a ball end 282 received by a spherical socket in the end portion 271 of the block 29.

The mechanism for moving the block 29 into shearing position also operates the means for moving the paper feed wheel 230 bodily away from the wheel 231. This means comprises a stop 290 attached by a screw 291 to the link 281 and adapted to engage a lever 292 pivoted at 293 upon the table 221 and having an end member 294 received by a recess 295 provided by the driving feed wheel supporting bracket 234.

Figure 4:
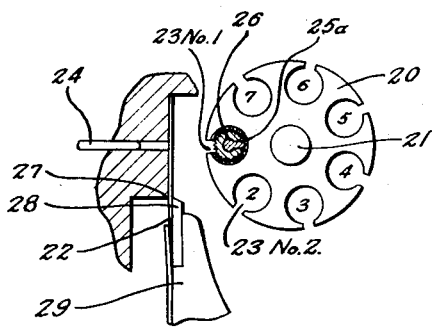
Figure 5:
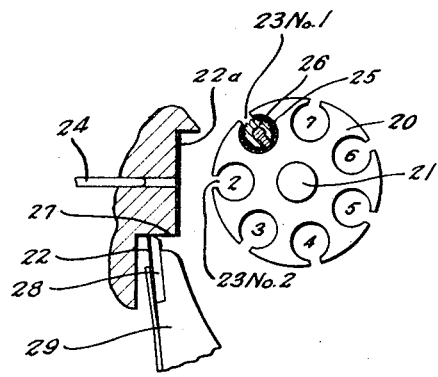

During the movement of the block 29 toward the left from the position shown in Fig. 4 into the position shown in Figs. 2, 3, 5, 6, 7, 8, 13 in order to cut the paper strip 22a from the supply strip 22 the feed wheel 230 is caused to be separated from the feed wheel 231. During the return of the block 29 into the position shown in Fig. 4 as effected by the spring 270 while the link 281 moves away from the bracket 272, the bracket 234 is permitted to move toward the right as viewed in Fig. 1, due to the action of a spring 234a confined between the bracket 234 and a stop 234b. While the block 29 remains in the position shown in Fig. 4 the guide wheel 230 is caused to rotate counterclockwise as viewed in Fig. 1 while being yieldingly urged against the paper 22 and the paper 22 against the roll 231 due to the action of the spring 234a which urges the bracket 234 toward the right as viewed in Fig. 1. As previously explained, the feeding of the paper 22 is effected during the counterclockwise swing of the clutch arm 240. When this arm 240 moves clockwise it becomes automatically disconnected from the shaft 232 due to the one-way clutch connection between the clutch shell 239 and the clutch cam 236. Therefore, the feed roll 230 will not back up during any part of the clockwise swing of the arm 240. As an additional precaution against the backing up of the paper 22 an additional one-way clutch connection is provided between the shaft 232 and a stationary part. Referring to Figs. 21 and 23 this clutch comprises the clutch cam 237 and cooperating rollers 300 and a clutch shell 301 carrying an arm 302 retained in a stationary position between the machine frame case and the end of the screw 303 carried by bracket 304 attached to the case.

The paper feeding and shearing mechanism is so coordinated with the armature core slot insulating mechanism that the paper strip 22 will be fed toward the stop surface 106 shown in Fig. 15

13 while the forming slide 24 is retracted and while the plunger 26 is operative to spread the loop 25 into such shape that it will line the entire wall of the core slot. During the bodily movement of the plunger from the position shown in Fig. 4 to that shown in Fig. 5, the paper shearing operation takes place.

Referring to Figs. 18, 19 and 20 the operation of the plunger 26 will be described in detail. The plunger 26 comprises a knurled portion 320 and a smooth lower end portion 321 less in diameter than the knurled portion 320 and flattened off at 322. The plunger 26 is provided with a central bore 323 which receives a spring 324 and a rod 325 carrying a vane 326 which projects through a slot 327 provided by the plunger, this slot extending through portions 321 and 320. Downward movement of the rod 325 relative to the plunger 26 is limited by a stop 328 at the lower end of the portion 321. As the plunger 26 descends, the tapered lower end of the part 321 enters the paper loop 25 and it begins to spread the same at the same time the vane 326 bears against the yoke portion of the loop and assists in clamping the same against that portion of the wall of the core slot which is nearest the shaft 21 thus holding the loop 25 centrally as near as possible with respect to the slot 23. While the vane maintains the loop in this position the plunger 26 descends still further from the position shown in Fig. 18 to that shown in Fig. 20 in order to cause the knurled portion 320 of the plunger to engage the loop which has been partially spread by the portion 321 in order that the loop will be shaped into cylindrical formation to conform to the wall of the core slot 23.

During the upward movement of the plunger 26, the loop 25 is prevented from moving upwardly by a stripper 330 having a notch 331 just large enough to clear the knurled portion 320 in the plunger. The stripper plate 330 is cut away at 332 to provide clearance for bodily movement of the plunger 26 clockwise as viewed in Fig. 1.

While the form of embodiment of the present invention as herein disclosed, constitutes a preferred form, it is to be understood that other forms might be adopted, all coming within the scope of the claims which follow.

What is claimed is as follows:

1. A machine for lining the slots of an armature core each with a separate strip of sheet insulating material which comprises, in combination, a core holder, a driven and an idle feed roll one of which is movable relative to the other and normally yieldingly urges a ribbon of sheet insulating material against said other roll; a knife for cutting off the end portions of said ribbon to provide a strip of material adjacent a core slot, and a cam actuated lever withdrawing the movable roll from engagement with said ribbon when actuating the knife.

2. A machine for lining the slots of an armature core each with a separate strip of sheet insulating material which comprises, in combination, a core holder, a driven and an idle feed roll, the driven roll being movable relative to the idle roll and yieldingly urging a ribbon of sheet insulating material against said idle roll, a knife for cutting off the end portions of said ribbon to provide a strip of material adjacent a core slot, and a cam actuated lever withdrawing the movable roll from engagement with the knife.

3. A machine for lining the slots of an armature core each with a separate strip of sheet insulating material which comprises, in combination, a core holder, a driven and an idle feed roll, the driven roll being movable relative to the idle roll and yieldingly urging a ribbon of sheet insulating material against said idle roll, a bracket bearing a knife blade, said bracket being pivoted about the axis of the idle roll so that the fed ribbon is in bodily contact with a surface of said bracket which extends to the knife edge at right angles to the movement of the knife, and a cam actuated lever withdrawing the movable roll from engagement with said ribbon when rocking said bracket to cut off the end portion of said strip.

4. A machine for lining the slots of an armature core each with a separate strip of sheet insulating material which comprises, in combination, a core holder, a driven and an idle feed roll one of which is bodily movable relative to the other and normally yieldingly urges a ribbon of sheet insulating material against the other roll; a knife for cutting off the end portion of said ribbon to provide a strip of insulating material adjacent a core slot; means for actuating the knife; and means actuated in response to operation of the last said means for bodily moving the movable feed roll away from the other feed roll.

5. A machine for lining the slots of an armature core each with a separate strip of sheet insulating material which comprises, in combination, a core holder, a driven and an idle feed roll; a bracket slidable in a linear direction and rotatably supporting one of said feed rolls; a spring urging the bracket in such direction that the feed roll carried thereby urges a ribbon of sheet insulating material against the other feed roll; a knife for cutting off the end portion of said ribbon to provide a strip of insulating material adjacent a core slot; means for actuating the knife; and means actuated in response to the operation of the last said means for moving the bracket against the tendency of the spring whereby the feed rolls are separated.

6. A machine for lining the slots of an armature core each with a separate strip of sheet insulating material which comprises, in combination, a core holder, a driven and an idle feed roll; a bracket slidable in a linear direction and rotatably supporting one of said feed rolls; a spring urging the bracket in such direction that the feed roll carried thereby urges a ribbon of sheet insulating material against the other feed roll; a knife for cutting off the end portion of said ribbon to provide a strip of insulating material adjacent a core slot; and means for simultaneously moving the bracket against the tendency of the spring whereby the feed rolls are separated and for actuating the knife.

7. A machine for lining the slots of an armature core each with a separate strip of sheet insulating material which comprises, in combination, a core holder; a pair of feed rolls; a bracket slidable in a linear direction and rotatably supporting one of said feed rolls; a spring urging the bracket in such direction that the feed roll carried thereby urges a ribbon of sheet insulating material against the other feed roll; a first over-running clutch for driving one of the feed rolls in the proper direction when actuating said clutch in one direction; a second over-running clutch one member of which is connected with the driven feed roll and the other member of which is held against rotation so that upon actuation of the first over-running clutch in the other direction said second over-running clutch prevents the driven feed roll from rotating contrary to the proper direction; means for actuating the first over-running clutch in either direction; a knife for cutting off the end portion of said ribbon to provide a strip of insulating material adjacent a core slot; and means actuated coordinately with the operation of the clutch actuating means for simultaneously moving the bracket against the tendency of the spring whereby the feed rolls are separated and for actuating the knife.

8. A machine for lining the slots of an armature core each with a separate strip of sheet insulating material which comprises, in combination, a core holder; a pair of feed rolls; a bracket slidable in a linear direction and rotatably supporting one of said feed rolls; a spring urging the bracket in such direction that the feed roll carried thereby urges a ribbon of sheet insulating material against the other feed roll; a first over-running clutch for driving one of the feed rolls in the proper direction when actuating said clutch in one direction; a second over-running clutch, one member of which is connected with the driven feed roll and the other member of which is held against rotation so that upon actuation of the first over-running clutch in the other direction said second over-running clutch prevents the driven feed roll from rotating contrary to the proper direction; means for actuating the first over-running clutch in either direction; a knife for cutting off the end portion of said ribbon to provide a strip of insulating material adjacent a core slot; means actuated coordinately with the operation of the clutch actuating means for moving the bracket against the tendency of the spring whereby the feed rolls are separated; and means actuated in response to operation of the bracket moving means for actuating the knife.

9. A machine for lining the slots of an armature core each with a separate strip of sheet insulating material which comprises, in combination, a core holder, a pair of feed rolls; a bracket slidable in a linear direction and rotatably supporting one of said feed rolls; a spring urging the bracket in such direction that the feed roll carried thereby urges a ribbon of sheet insulating material against the other feed roll; a first over-running clutch for driving one of the feed rolls in the proper direction when actuating said clutch in one direction; a second over-running clutch, one member of which is connected with the driven feed roll and the other member of which is held against rotation so that upon actuation of the first over-running clutch in the other direction said second over-running clutch prevents the driven feed roll from rotating contrary to the proper direction; a rotary shaft; means including an eccentric on said shaft for actuating the first over-running clutch in either direction; a knife for cutting off the end portion of said ribbon to provide a strip of insulating material adjacent a core slot; means for simultaneously moving the bracket against the tendency of the spring whereby the feed rolls are separated and for actuating the knife; and means on said shaft for actuating the last said means.

10. A machine for lining the slots of an armature core each with a separate strip of sheet insulating material which comprises, in combination, a core holder; a pair of rolls for feeding a ribbon of insulating material; a first over-running clutch for driving one of the feed rolls in the proper direction when actuating said clutch in one direction; a second over-running clutch one member of which is connected with the driven feed roll and the other member of which is held against rotation so that upon actuation of the first over-running clutch in the other direction said second over-running clutch prevents the driven feed roll from rotating contrary to the proper direction; a knife for cutting off the end portion of said fed ribbon to provide a strip of insulating material; and means actuated coordinately with the operation of the clutch actuating means for actuating the knife.

11. Apparatus for supplying to an armature core slot lining machine strips of insulating material, each of sufficient length to line a core slot, said apparatus consisting of means for feeding a strip of insulating material so that an end portion thereof will be located adjacent a core slot, and means for cutting off a piece of insulating material preparatory to inserting it into the core slot, said last mentioned means comprising a stationary and a cooperating movable shear blade and a swingable bracket carrying the movable shear blade, said bracket also providing a track for guiding the fed strip of insulating material past the shearing edge of the movable shear blade.

12. A machine for lining each slot of an armature core with a flexible strip of insulating material comprising, in combination, a core holder; means for introducing a loop of insulating material of proper length into a core slot; means for spreading the loop to cause it to engage the wall of the core slot; and means for clamping the yoke portion of the loop to the core slot wall as the loop is spread.

13. A machine for lining each slot of an armature core with a flexible strip of insulating material comprising, in combination, a core holder; means for introducing a loop of insulating material of proper length into a core slot; reciprocating means for spreading the loop to cause it to engage the wall of the core slot when said means moves into the core slot; means for clamping the yoke portion of the loop to the core slot wall as the loop is spread; and a stripper plate adjacent the core slot for preventing the spread loop in the core slot from following the spreading means when the latter moves out of the core slot.

14. A machine for lining each slot of an armature core with a flexible strip of insulating material comprising, in combination, a core holder; means for introducing a loop of insulating material of proper length into a core slot; reciprocating means for spreading the loop to cause it to engage the wall of the core slot when said means move into the core slot; means yieldingly carried by the spreading means for clamping the yoke portion of the loop to the core slot wall as the loop is spread; and a stripper plate adjacent the core slot for preventing the spread loop in the core slot from following the spreading means and clamping means when the latter move out of the core slot.

15. A machine for lining each slot of an armature core with a flexible strip of insulating material comprising, in combination, a core holder; means for introducing a loop of insulating material of proper length into a core slot; a plunger reciprocating parallel to the core slots and adapted to spread the loop to cause it to engage the wall of the core slot when the plunger moves into the core slot, said plunger having a reduced portion which spreads the loop a substantial amount and another portion which urges the substantially spread loop into engagement with the wall of the core slot; means carried by the plunger for clamping the yoke portion of the loop to the core slot wall while the reduced plunger portion substantially spreads the loop; and a stripper plate adjacent the core slot for preventing the completely spread loop in the core slot from following the withdrawing plunger and clamping means carried thereby.

16. A machine for lining each slot of an armature core with a flexible strip of insulating material comprising, in combination, a core holder; means for introducing a loop of insulating material of proper length into a core slot; a plunger reciprocating parallel to the core slots and adapted to spread the loop to cause it to engage the wall of the core slot when the plunger moves into the core slot, said plunger having a reduced portion which spreads the loop a substantial amount and another portion which urges the substantially spread loop into engagement with the wall of the core slot; a vane yieldingly carried by the plunger and projecting from the reduced portion thereof for clamping the yoke portion of the loop to the core slot wall while the reduced plunger portion substantially spreads the loop; and a stripper plate adjacent the core slot for preventing the completely spread loop in the core slot from following the withdrawing plunger and vane carried thereby.

17. A machine for lining each slot of an armature core with a flexible strip of insulating material comprising, in combination, a holder for supporting a core for rotation about its own axis; means for introducing a loop of insulating material of proper length into a core slot; a plunger reciprocable parallel to the core slots and rotatable about the core axis, said plunger having a reduced portion which spreads the loop a substantial amount and another portion which urges the substantially spread loop into engagement with the core slot wall upon movement of the plunger into the core slot; means for rotating the plunger through a predetermined angle about the axis of the core while the plunger is projecting into the core slot whereby the core is indexed so that a consecutive core slot is in proper alignment with the strip introducing means; means for reciprocating the plunger into the core slot while in alignment with the strip introducing means and out of the core slot after the indexing of the core; and a stationary stripper plate for preventing the spread loop in the core slot from following the retracting plunger, said stripper plate being so constructed that it will not interfere with the rotary movement of the plunger about the core axis.

18. A machine for lining each slot of an armature core with a flexible strip of insulating material comprising, in combination, a core holder; means for laterally introducing a loop of insulating material of proper length into a core slot; a plunger reciprocable parallel to the core slots, said plunger having a reduced portion for spreading the loop a substantial amount and another knurled portion for uniformly urging the substantially spread loop into engagement with the core slot wall upon movement of the plunger into the core slot; and a stripper plate adjacent the core slot, said plate providing clearance for the knurled plunger portion but not for the loop in the core slot whereby the latter is prevented from following the retracting plunger.

19. A machine for lining each slot of an armature core with a flexible strip of insulating material comprising, in combination, a core holder; means for laterally introducing a loop of insulating material of proper length into a core slot; a plunger reciprocable parallel to the core slots, said plunger having a reduced portion for spreading the loop a substantial amount and another knurled portion for uniformly urging the substantially spread loop into engagement with the core slot wall upon movement of the plunger into the core slot; a vane yieldingly carried by the plunger and adapted to clamp the yoke portion of the loop to the core slot wall while the loop is being spread into engagement with the core slot wall; and a stripper plate adjacent the core slot, said plate providing clearance for the knurled plunger portion and vane but not for the loop in the core slot whereby the latter is prevented from following the retracting plunger and vane carried thereby.

ALVA W. PHELPS.